United States Patent [19]
Lee

[11] Patent Number: 6,080,962
[45] Date of Patent: Jun. 27, 2000

[54] SELF-CONTAINED THERMAL CONTROL FOR A SPACECRAFT MODULE

[75] Inventor: David W. Y. Lee, Torrance, Calif.

[73] Assignee: TRW, Inc., Redondo Beach, Calif.

[21] Appl. No.: 08/771,466

[22] Filed: Dec. 20, 1996

[51] Int. Cl.[7] .................................................. H05B 1/00
[52] U.S. Cl. ........................ 219/209; 165/41; 244/158 A
[58] Field of Search .................................. 219/209, 385, 219/386, 387; 126/400, 634, 635; 165/41, 41.1, 8.1, 48.12, 49.14, 104.14, 201; 244/158 R, 159, 158 A

[56] References Cited

U.S. PATENT DOCUMENTS 4,880,050  11/1989  Nakamura et al. ........................ 165/41
5,823,477  10/1998  York .................................... 244/163

*Primary Examiner*—John A. Jeffery
*Assistant Examiner*—Thor Campbell
*Attorney, Agent, or Firm*—Michael S. Yatsko

[57] ABSTRACT

A spacecraft electronics equipment module that is thermally independent of a core spacecraft structure to which it can be mounted. The module takes the form of a thermal radiation panel on which electronic components are directly mounted. The panel is attachable to the core structure and includes its own double-sided radiator for cooling of the electronics components, an integral heater for raising the temperature is needed, a thermal controller, for automatically regulating the temperature of the module components, and heatpipes for distributing the heat more uniformly across the radiating surfaces.

6 Claims, 1 Drawing Sheet

SELF-CONTAINED THERMAL CONTROL FOR A SPACECRAFT MODULE

BACKGROUND OF THE INVENTION

This invention relates generally to modular spacecraft engineering and, more particularly, to spacecraft electronic equipment modules that can be externally mounted on a core spacecraft structure. Conventional spacecraft designs have placed electronic equipment on panels located inside box-like modules, with the panels typically forming the walls of the modules. The modules are mounted onto a spacecraft and interconnected with complex interconnecting wiring. Heat dissipated from the electronics equipment is conducted into the module panels and radiates into space. The size of each module is determined in part by the heat radiating area needed to cool the equipment, so there is often unused volume within each module box or compartment. Because only one side of the equipment panel is used as a radiator, the modules often have to be very large to maintain desired operating temperatures. A related problem is that accessing equipment requires the removal of panels from the equipment compartment. Not only are modules of this type bulky to accommodate in a launch vehicle and difficult to access for servicing, but they typically need to be coupled to other thermal radiator panels, through heat-conducting pipes, to provide overall thermal management of the spacecraft.

Further, because the box modules are rigidly bolted to the core structure of the spacecraft, thermally induced stresses are a significant problem because of temperature differences between the modules and the spacecraft core structure. In brief, these conventional equipment modules are structurally and thermally dependent on the spacecraft core structure, and the overall design of the spacecraft must take into account the thermal requirements of each module and the structural forces resulting from the presence of each module.

As a result of these difficulties, the spacecraft core structure is usually constructed to have a relatively high weight and volume, to support the modules and to provide an adequate thermal radiation area. Also, it is usually the case that the choice of materials of both the modules and the spacecraft core structure is limited because there is a concern for differential thermal expansion. A further difficulty is that removal or addition of a module upsets the overall structural and thermal design to some degree. Alignment problems, thermal management problems, or both, can result from simply removing or adding a module.

All of the foregoing problems are attributable to interdependence of the modules and the spacecraft core structure, which together interact, both structurally and thermally, as parts of a larger assembly. It will be appreciated, therefore, that there is a need for a different approach to the construction of spacecraft modules for supporting electronic equipment, to overcome the difficulties noted above. The present invention is directed to the undesirable thermal dependence of modules on the spacecraft as whole.

SUMMARY OF THE INVENTION

The present invention resides in a spacecraft equipment module that is thermally isolated from a spacecraft core structure to which the module is attached. Briefly, and in general terms, the module of the invention comprises a base panel that also serves as a thermal radiator; electronic components mounted on the base structure; a module heater; and a thermal controller, for regulating the temperature of the electronic components by selectively activating the module heater or taking other action. The module is thermally independent of the spacecraft core structure and, therefore, multiple modules can be more easily integrated into a spacecraft for a specific mission. Preferably, the module also includes at least one heat-conducting pipe installed integrally with the base panel, to distribute heat more uniformly across the radiating surfaces of the panel.

It will be appreciated from the foregoing that the present invention represents a significant advance in the field of modular spacecraft construction. In particular, the invention provides a module that is thermally independent of other modules and of the core structure to which it is mounted. Other aspects and advantages of the invention will become apparent from the following more detailed description, taken in conjunction with the accompanying drawings.

DESCRIPTION OF THE PREFERRED EMBODIMENT

Figure 1:
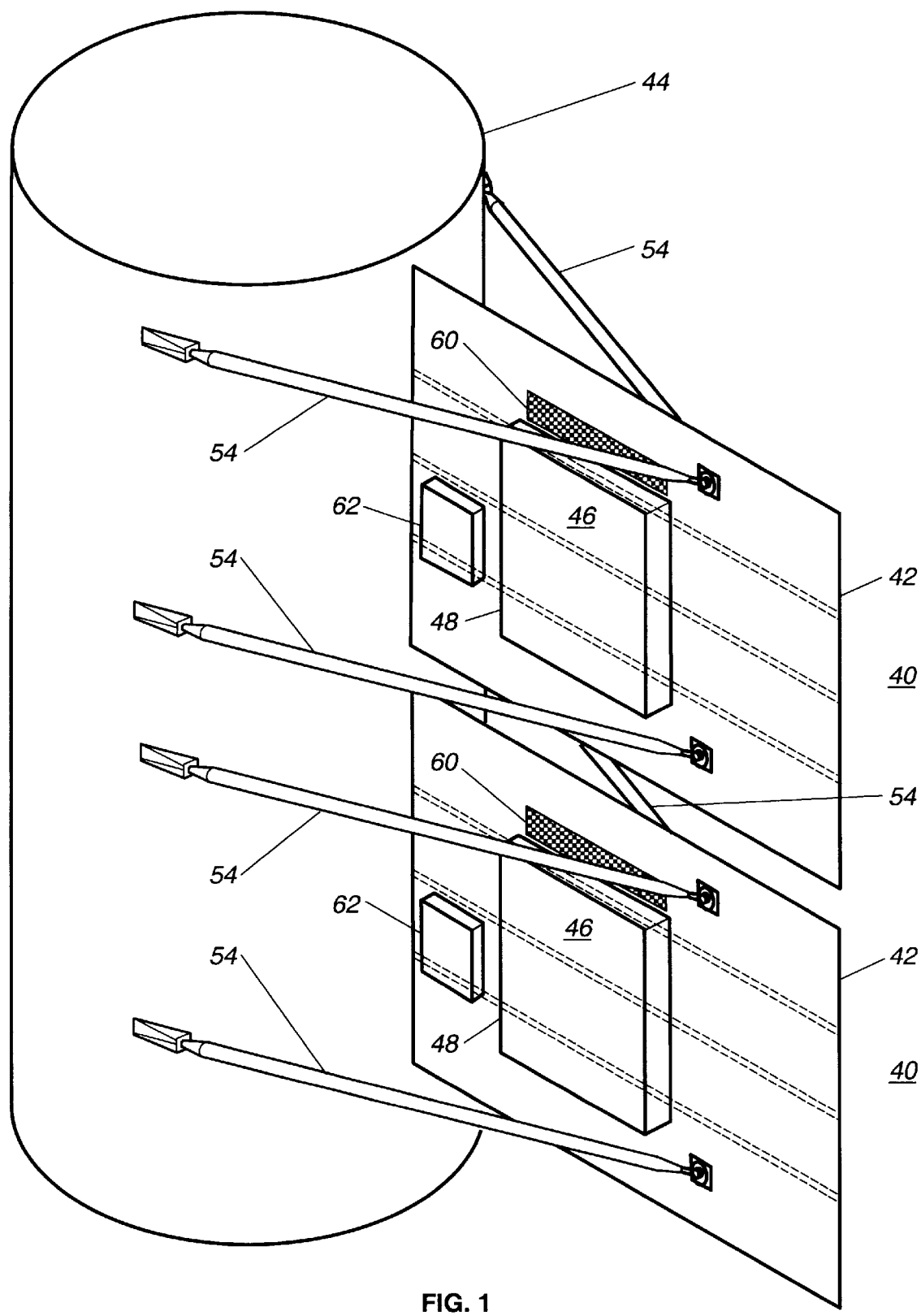
FIG. 1 is an isometric view of two thermally independent spacecraft modules in accordance with the present invention, shown in relation to a spacecraft core structure.

As shown in the drawings for purposes of illustration, the present invention pertains to a spacecraft electronics equipment module. In the past, spacecraft modules have been housed in boxes rigidly mounted on a spacecraft core structure, and have been thermally dependent on the core structure. This dependence has led to a variety of problems, such as overly bulky construction, induced thermal stresses, and the need for heat pipes to conduct thermal energy away from the modules. Box-like modules also use launch vehicle volume very inefficiently.

In accordance with the invention, a spacecraft equipment module is constructed to be thermally independent of the spacecraft core structure to which it is attached.

By way of a more specific example, FIG. 1 depicts the structural details of two adjacent spacecraft modules 40 in accordance with the present invention. Each module 40 in this example is structured on a flat, generally rectangular radiator panel 42, which is attached to a spacecraft core structure 44. The core structure 44 can be very simple in construction and light in weight because each module 40 is structurally self-sufficient from its points of attachment to the core structure 44. The module 40 includes an electronics element 46 mounted on the panel 42 and protected by a radiation cover 48. The electronics element 46 includes electronic and RF elements (not shown in detail), typically mounted on a circuit board and installed under the cover 48. Each module 40 has a set of four struts 54, three of which are visible in the drawing. Mechanical attachment to the core structure 44 also requires mounting brackets, which are not shown because they are not relevant to the present invention.

The radiation panel 42 is nominally two-sided, for thermal radiation in two directions, but can be used as a single-sided radiator, as when mounted parallel to the supporting or core structure. Heat pipes, portions of which are shown in outline at 58, can be attached directly to the panel 42 to increase the thermal efficiency and capacity of the radiator 42 by conducting heat over substantially the entire radiating surface.

For a particular system design, modules 40 can be added or deleted without impacting the complexity of the design at a system level. The only significant limiting factor is the maximum capacity of the core structure and any associated solar arrays. In effect, the modular design of the system tends to move complexity inside the individual module boundaries and dramatically reduce system level complexity and design requirements.

In accordance with the invention, each of the modules 40 is thermally selfsufficient. Cooling of the electronics unit 46 is provided by radiation from the double-sided panel 42. If heating is required, heaters 60 integral with the panels 42 provide the necessary energy. A thermal controller 62 is also provided for each module 40. The controller 40 monitors the temperature of the electronics units 46 and actuates the heaters 60 as necessary to maintain the temperature above a specified minimum value. If the temperature becomes to high, although the controller 62 cannot directly increase the radiated thermal energy, it can take other action, such as shutting down some of the electronics components, generating an alarm signal, or effecting a change in the spacecraft orientation to increase the cooling effect of the radiator panel 42.

It will be appreciated from the foregoing that the present invention represents a significant advance in the field of spacecraft module design. In particular, the invention provides an externally mountable equipment module that is thermally independent of the structure to which it is mounted, and independent of other modules. It will also be appreciated that, although a specific embodiment of the invention has been disclosed for purposes of illustration, various modifications may be made without departing from the spirit and scope of the invention. Accordingly, the invention should not be limited except as by the appended claims.

What is claimed is:

1. An externally mountable spacecraft equipment module for attachment to a spacecraft core structure, the spacecraft equipment module comprising:

a base panel that also serves as a thermal radiator to dissipate heat by radiation into space;

electronic components mounted on the base panel;

a module heater; and a thermal controller, for regulating the temperature of the electronic components by selectively activating the module heater or shutting down selected electronic components;

wherein heat generated by the electronics components is dissipated by direct radiation from the base panel, and the module is thermally independent of the spacecraft core structure.

2. An externally mountable spacecraft equipment module as defined in claim 1, and further comprising at least one heat-conducting pipe installed integrally with the base panel and extending across a region of the base panel adjacent to the electronic components, to distribute heat across the panel radiating surfaces by conducting heat from the region adjacent to the electronics components to other regions of the base panel.

3. An externally mountable spacecraft equipment module as defined in claim 1, wherein:

the thermal controller is coupled to the module heater and to selected electronic components, wherein a higher temperature can be obtained by generating more heat in the module heater, and a lower temperature can be obtained by generating less heat in the module heater and, if necessary, disabling the selected electronic components.

4. A spacecraft having at least one thermally independent equipment module, the spacecraft comprising:

a spacecraft core structure;

a spacecraft equipment module including
a base panel that also serves as a thermal radiator to dissipate heat by radiation into space,
electronic components mounted on the base structure,
a module heater, and
a thermal controller, for regulating the temperature of the electronic components by selectively activating the module heater or shutting down selected electronic components;
wherein heat generated by the electronic components is dissipated by direct radiation from the base panel, and the spacecraft equipment module is thermally independent of the spacecraft core structure.

5. A spacecraft as defined in claim 4, and further comprising at least one heat-conducting pipe installed integrally with the base panel and extending across a region of the base panel adjacent to the electronic components, to distribute heat across the panel radiating surfaces by conducting heat from the region adjacent to the electronics components to other regions of the base panel.

6. A spacecraft as defined in claim 4, wherein:

the thermal controller is coupled to the module heater and to selected electronic components, wherein a higher temperature can be obtained by generating more heat in the module heater, and a lower temperature can be obtained by generating less heat in the module heater and, if necessary, disabling the selected electronic components.

* * * * *